United States Patent Office 3,213,046
Patented Oct. 19, 1965

3,213,046
CELLULOSE ACETATE FIBERS MODIFIED WITH DIISOCYANATE - POLYOXYETHYLENE REACTION PRODUCTS
Robert C. Harrington, Jr., and James L. Smith, Kingsport, Tenn., assignors to Eastman Kodak Company, Rochester, N.Y., a corporation of New Jersey
No Drawing. Filed May 17, 1961, Ser. No. 110,640
4 Claims. (Cl. 260—13)

This invention relates to the manufactuer of synthetic fibers from the lower fatty acid esters of cellulose, and more particularly to the manufacture of cellulose acetate fibers having an improved affinity for acid wool dyes.

In the textile industry it is often desirable to use fibers of different kinds in the manufacture of fabrics. After the fabric has been woven, it is usually subjected to a dyeing operation, and it is desirable that the different kinds of fibers have dyeing properties that are substantially the same.

In those fabrics in which cellulose ester fibers are combined with the fibers of natural wool, it has commonly been necessary heretofore to employ both an acetate dyestuff and a wool dyestuff to impart satisfactory color to the fabric. In many cases considerable difficulty has been encountered in matching the shades of the wool fibers and the cellulose ester fibers. In addition, the two types of dyestuffs often respond differently to laundering, light fading, and the like, resulting in fabrics having a spotty or irregular appearance after being exposed to conditions of wear and cleaning.

Many attempts have been made heretofore to impart properties to cellulose ester fibers so that they are receptive to acid-type dyes, but the results obtained have not been entirely satisfactory.

An object of this invention is to prepare fibers of the lower fatty esters of cellulose having good susceptibility to acid dyes and good stability, when so dyed, to fading by light and by laundering.

Another object of this invention is to provide a composition of matter which, when formed into fibers by conventional means, can be dyed readily with acid wool dyes.

A further object of this invention is to provide a novel composition of matter which is comprised of the heat reaction product of an organic diisocyanate and a polyoxyethylene.

Other and further objects of the invention will appear hereinafter. For a complete understanding of the nature and the objects of the invention, reference is made to the following detailed description.

In accordance with this invention there are prepared fibers comprised of cellulose organic acid esters and the reaction product of an organic diisocyanate and polyoxyethylene. The presence of the reaction product of an organic diisocyanate and polyoxyethylene in the fiber imparts acid wool dyeing properties thereto. The fibers can be colored deep shades by acid wool dyes applied by conventional methods.

The reaction product of an organic diisocyanate and polyoxyethylene employed in this invention is perpared by heating to reaction, usually at a temperature of from about 100° C. to 120° C. for a period of time of from about 15 minutes to 30 minutes, from about 1 mole to 2 moles of the organic diisocyanate and 1 mole of the polyoxyethylene. Highly satisfactory reaction products are prepared when about 1.2 moles of the organic diisocyanate are employed and 1 mole of the polyoxyethylene.

The polyoxyethylenes employed in carrying out this invention are the polymers of ethylene oxide and can be prepared in any suitable manner such, for example, as by contacting liquid ethylene oxide at suitable temperatures with Fuller's earth or other similar material containing aluminum oxide. The products of polymerization are mixed polymers of varying molecular weights and range from a syrupy liquid through waxy solids to rubbery compounds. By suitable treatment the polymers can be separated into several fractions. Each of the several fractions contains polymers of different degrees of polymerization but of substantially similar or related characteristics. Polyoxyethylenes are well known in the art and are available commercially.

For the purposes of this invention it is preferred to use polyoxyethylene having an average molecular weight of from between about 4000 to 6000; however, lower and higher molecular weight poloxyethylenes can be employed if desired. It is recommended however, that the polyoxyethylene employed have a molecular weight of at least 500 owing to the fact that reaction products of organic diisocyanates and the lower molecular weight polyoxyethylene wash out of the fibers readily and hence are unsatisfactory. It is recommended also that the molecular weight of the polyoxyethylene employed not exceed about 20,000 owing to the fact that reaction products of organic diisocyanates and such polyoxyethylenes are not readily soluble in conventional cellulose acetate spinning solutions.

The organic diisocyanates employed in perparing the reaction product of this invention can be of the aliphatic or aromatic series.

Among the aliphatic diisocyanates that can be employed are tetramethylene diisocyanate, pentamethylene diisocyanate, hexamethylene diisocyanate, heptamethylene diisocyanate, and octamethylene diisocyanate. The presence of substituents, such as alkyl groups, is not excluded. An example of a cycloaliphatic diisocyanate is cyclohexyl-1,4-diisocyanate.

Aromatic diisocyanates that have proved particularly suitable are those of the benzene and diphenyl series. Examples of such aromatic diisocyanates include phenylene-1,4-diisocyanate, 1-chloro-phenylene-2,4-diisocyanate, meta-tolylene diisocyanate, diphenyl-4,4' - diisocyanate, 3,3'-dimethyldiphenyl-4,4'-diisocyanate, 3,3'-dimethoxydiphenyl-4,4'-diisocyanate, and 3,3'-dimethyldiphenylmethane 4,4'-diisocyanate. Also, the carbon chains between the isocyanate groups can be hetero atoms such as oxygen and sulfur or be hetero groups such as carbonamide groups. Mixtures of two or more diisocyanates can be employed if desired.

This invention is adapted to impart a wool-dyeing property to the various lower fatty acid esters of cellulose which have been employed for preparing synthetic fabrics. These cellulose organic acid esters are well known in the art and include those esters derived from cellulose and the lower fatty acids having from 1 to 4 carbon atoms. For instance, cellulose acetate which has been hydrolyzed to an acetyl content of from about 39 percent to 40 percent is much employed, especially in acetone solution for making synthetic fibers. While acetone is the solvent usually employed for spinnig cellulose ester, it is to be understood that other solvents such as methyl acetate, methylene chloride, tetrachlorethane, dioxane, nitro methane, ethylene glycol monomethyl ether acetate, diacetone alcohol, and methyl ethyl ketone alcohol can be satisfactorily employed. Other suitable solvents are well known in the art.

Also other cellulose esters, such as cellulose acetate propionate or cellulose acetate butyrate having a propionate or butyrate content of from about 1 percent to 6 percent such as described in U.S. Patent No. 2,223,376, can be employed in accordance with the present invention. Also cellulose esters having even higher propionate or butyrate content can be employed.

Cellulose triacetate fibers and cellulose tripropionate can be modified in accordance with this invention. Suitable solvents for preparing spinning solutions of the above enumerated cellulose esters are well known and include certain of those enumerated above as suitable for preparing cellulose acetate spinning solutions. Methylene chloride is the most commonly used solvent for these esters.

In preparing the spinning solutions for use in carrying out this invention the reaction product of the diisocyanate and polyoxyethylene can be prepared prior to spinning of the fiber and is added to the cellulose ester spinning solution in amounts of from about 5% to 10%, by weight, based on the weight of the solids in the spinning solution. Higher concentrations of the reaction product do not add anything to the dyeing of the fiber and lower concentrations do not give fully satisfactory results. After the reaction product of the diisocyanate and the polyoxyethylene has been added and incorporated into the cellulose ester spinning solution, fibers are spun therefrom in a conventional manner known in the art.

Particularly satisfactory fibers of this invention are comprised of cellulose acetate and from about 5% to 10% by weight, based on the weight of the cellulose acetate of the reaction product derived by heating an admixture of from about 1 mole to 2 moles of an organic diisocyanate and about 1 mole of a polyoxyethylene having an average molecular weight of from about 4000 to 6000.

It is possible, also, and highly satisfactory results have been obtained, to first add the polyoxyethylene to the spinning solution. Subsequently, fibers are spun from this spinning solution to provide a fiber in which is incorporated the polyoxyethylene.

The fibers thus prepared are passed through a bath containing the organic diisocyanate dissolved in a suitable solvent such, for example, as toluene, naphtha, or diethyl ether. This solution is preferably maintatined at a temperature of about 75° C. to 120° C. and, as the fibers are passed through the solution, the diisocyanate reacts with substantially all the polyoxyethylene present in the fibers to provide cellulose ester fibers in which there is incorporated the reaction product of the diisocyanate and the polyoxyethylene.

Fibers formed in this manner have substantially the same dyeing properties as those prepared from a spinning solution in which the reaction product of the diisocyanate and the polyoxyethylene has been incorporated prior to spinning.

The following examples are illustrative of this invention. All parts are by weight unless otherwise indicated.

Example I

About 19.2 parts of tolylene diisocyanate (0.12 mole) and about 400 parts of polyoxyethylene of an average molecular weight of about 4000 (0.1 mole) are placed in an open reaction vessel and heated to a temperature of about 115° C. and maintained at this temperature for about 15 minutes. The reaction product is a white solid that is insoluble in water but is soluble in acetone and other solvents commonly used for the preparation of cellulose ester spinning solutions.

Example II

About 25 parts of the reaction product of Example I are added to 1000 parts of a 25% cellulose acetate (38.3% acetyl) solution in acetone. The resulting solution is stirred for a period of about 24 hours, filtered and then spun in the conventional manner to produce a 150 denier, 38 filament yarn. The physical properties of the yarn are essentially the same as a control yarn prepared from a similar spinning solution of the cellulose acetate in which there has not been incorporated any of the diisocyanate-polyoxyethylene reaction product. The yarn produced in accordance with this example is woven into fabric and scoured at about 140° F. Separate pieces of this fabric are dyed with Alizarine Supra Blue A and Polar Red RL Concentrate which, as is well known in the art, are typical acid-type dyes. The pieces of fabric are dyed to a much darker shade than are pieces of the control fabric. The control fabric is not colored with the red dye and the blue dye imparts thereto only a very light shade of blue. The fabric of this invention and the control fabric are dyed with Eastone Red NGLF and Eastman Blue GLF disperse dyes, which are conventional cellulose ester dyes, and the dyeings with these two dyes are substantially the same on the two fabrics.

Example III

The reaction product of Example I is added to a spinning solution of cellulose triacetate in a mixed solvent consisting of methylene chloride and methyl alcohol in an amount equal to about 7 percent, by weight, based on the weight of the cellulose triacetate solids in the spinning solution. The yarn is prepared from the resulting spinning solution in the same manner as that employed in Example II above and fabric subsequently prepared therefrom. The fabric prepared from this yarn dyes to dark shades with acid dyes and is fast to scouring. The dyeing properties are substantially unchanged when dyed with disperse dyes.

Example IV

About 15 parts of hexamethylene diisocyanate are mixed with 500 parts of polyoxyethylene having an average molecular weight of about 4000. The reaction is carried out in an open reaction vessel at a temperature of about 100° C., which temperature is maintained for a period of about 20 minutes. The reaction product is a white solid that is insoluble in water and soluble in acetone and other solvents ordinarily used in the preparation of spinning solutions from cellulose esters.

Example V

About 20 parts of the reaction product of Example IV are added to about 1000 parts of a 25% solution of cellulose acetate (38.3% acetyl) in acetone. After thorough mixing and filtration, yarn of 150 denier and 38 filaments is spun from the solution in a conventional manner. The yarn has a strength of about 1.27 grams per denier and a stretch of about 28%. A skein of this yarn is scoured and dyed with Alizarine Supra Blue A to give a dark shade. A control yarn treated in the same manner is only slightly stained by the dye.

Example VI

About 15 parts of 3,3'-dimethyldiphenylmethane-4,4'-diisocyanate are mixed with about 500 parts of polyoxyethylene having an average molecular weight of about 4000. The reaction is carried out in an open reaction vessel at a temperature of about 100° C., which temperature is maintained for a period of about 20 minutes. The resulting reaction product is a white solid that is insoluble in water, but soluble in acetone.

Example VII

About 20 parts of the reaction product of Example VI are added to about 1000 parts of a 25% solution of cellulose acetate (38.3% acetyl) in acetone. After thorough mixing and filtration, yarn of 150 denier and 38 filaments is spun from the solution in a conventional manner. A skein of this yarn is scoured and dyed with Alizarine Supra Blue A to give a dark shade while a skein of control cellulose acetate yarn is only slightly tinted.

The above examples illustrate the first method by which the novel reaction products of this invention can be incorporated into a finished filament. That is, the reaction product of the diisocyanate and the polyoxyethylene is first prepared and then incorporated into the cellulose ester spinning solution prior to spinning filaments therefrom.

The second method will be illustrated in the examples that follow. This method, as more fully set forth hereinabove, comprises adding the desired polyoxyethylene to the spinning solution prior to reaction with the diisocyanate to provide a spinning solution comprised of the cellulose ester and the polyoxyethylene. Filaments are spun from the resulting solution and subsequently passed through a bath containing the organic diisocyanate dissolved in a suitable solvent such, for example, as toluene wherein the polyoxyethylene contained in the fiber reacts with the organic diisocyanate.

It has been determined that this procedure, that is, reacting the organic diisocyanate with the polyoxyethylene after the polyoxyethylene has been first incorporated into the filament or fiber, produces a fiber that has slightly better dyeing properties than do the fibers prepared by the first method. This is particularly true when the fibers are prepared from spinning solutions which are comprised of cellulose acetate having an acetyl value of from about 37.5% to 40.5%.

It is believed that the improved dyeing properties of the fibers prepared in this manner may be caused by a small amount of the organic diisocyanate reacting with the free hydroxyl groups of the cellulose acetate. However, it has been determined also that merely reacting or treating yarn prepared from cellulose acetate alone with diisocyanate does not result in a yarn having satisfactory dyeing properties. Further, these fibers do not have high-strength properties. It has been determined also that the dyeing properties of cellulose ester yarns which contain from about 5% to 10%, by weight, of polyoxyethylene are not as satisfactory as the fibers prepared in accordance with this invention.

*Example VIII*

Polyoxyethylene having an average molecular weight of about 6000 is added to a cellulose acetate (38.5% acetyl) spinning solution in an amount equal to about 5%, by weight, based upon the weight of the cellulose acetate solids content of the spinning solution. Yarn is spun from the resulting spinning solution in a conventional manner and the yarn is transferred to a package dyeing cone and is placed in a conventional package dyeing machine. A 3% solution of tolylene diisocyanate in toluene, maintained at a temperature of about 80° C., is forced through the package for about 1 hour and 15 minutes. The machine and package are then flushed with a detergent solution and rinsed. The yarn is subsequently dyed on the package in a conventional manner with Alizarine Supra Blue A. The yarn is uniformly dyed to a deep blue shade and is highly satisfactory. Dyeing results are essentially the same when the dye, Polar Red-RL Concentrate, is employed.

*Example IX*

Polyoxyethylene having an average molecular weight of about 10,000 is added to a spinning solution of cellulose tripropionate in an amount equal to about 8%, by weight, based on the weight of the cellulose tripropionate solids. Yarn is prepared from this spinning composition and treated with a 5% solution of tolylene diisocyanate dissolved in diethyl ether by submerging a skein of the yarn in the solution for about 2 hours during which time the solution is maintained substantially at room temperature. The skein is removed from the solution, scoured and dyed with Alizarine Supra Blue A. Excellent dyeing results are obtained and the color is fast to scouring.

*Example X*

Cellulose acetate yarn (38.5% acetyl) containing about 6% of polyoxyethylene having an average molecular weight of about 4,000 is prepared from an acetone solution of cellulose acetate and polyoxyethylene. A skein of the yarn (150 denier, 38 filaments) is soaked in a 3% solution of 3,3'-dimethyldiphenylmethane-4,4'-diisocyanate in benzene for a period of about 1 hour during which time the solution is maintained substantially at room temperature. The yarn is removed from the solution, scoured and dyed along with two other yarn samples, one sample being a conventional acetate yarn and the other sample, a portion of the acetate yarn containing the polyoxythylene which has not been reacted with the diisocyanate. The dyes used for dyeing these three samples are Alizarine Supra Blue A and Polar Red-RL Concentrate. The results indicate that the yarn prepared in accordance with this invention has far superior dyeing properties and is fast to scouring. The other two samples are only slightly stained by the dyes and the dyeing properties thereof are unsatisfactory.

*Example XI*

The procedure of Example X is repeated with the exception that hexamethylene diisocyanate (3% solution in benzene) is employed in place of the 3,3'-dimethyldiphenylmethane-4,4'-diisocyanate. The dyeing properties of the resulting fibers are highly satisfactory and the fibers are dyed to deep dark shades by acid-type dyes.

It is to be understood that the above description and examples are illustrative of the invention and not in limitation thereof.

We claim:

1. Cellulose organic acid ester fibers having dyeing properties substantially equivalent to that of wool comprising a lower fatty acid ester of cellulose having from 1 to 4 carbon atoms and from about 5% to 10% by weight, based on the weight of the ester of cellulose, of the reaction product derived by heating an admixture of from about 1 mole to 2 moles of an organic diisocyanate and about 1 mole of a polyoxyethylene having an average molecular weight of from about 500 to 20,000.

2. Cellulose organic acid ester fibers having dyeing properties substantially equivalent to that of wool comprising a lower fatty acid ester of cellulose having from 1 to 4 carbon atoms and from about 5% to 10% by weight, based on the weight of the ester of cellulose of the reaction product derived by heating an admixture of about 1.2 moles of an organic diisocyanate and about 1 mole of a polyoxyethylene having an average molecular weight of from about 4000 to 6000.

3. Fibers having dyeing properties substantially equivalent to that of wool comprising cellulose acetate and from about 5% to 10% by weight, based on the weight of the cellulose acetate, of the reaction produce derived by heating an admixture of from about 1 mole to 2 moles of an organic diisocyanate and about 1 mole of a polyoxyethylene having an average molecular weight of from about 4000 to 6000.

4. Fibers having dyeing properties substantially equivalent to that of wool comprising cellulose acetate and from about 5% to 10% by weight, based on the weight of the cellulose acetate, of the reaction product derived by heating an admixture of about 1.2 moles of an organic diisocyanate and about 1 mole of a polyoxyethylene having an average molecular weight of from about 4000 to 6000.

References Cited by the Examiner

UNITED STATES PATENTS

| | | | |
|---|---|---|---|
| 2,333,639 | 11/43 | Christ et al. | 260—16 |
| 2,675,360 | 4/54 | Caldwell | 260—13 |
| 2,948,691 | 8/60 | Windemuth et al. | 260—13 |
| 2,977,330 | 3/61 | Brower | 260—2.5 |

FOREIGN PATENTS 701,192   12/53   Great Britain.

JOSEPH L. SCHOFER, *Primary Examiner.*

LEON J. BERCOVITZ, JAMES A. SEIDLECK,
*Examiners.*